United States Patent [19]

Ogawa et al.

[11] Patent Number: 5,133,895
[45] Date of Patent: Jul. 28, 1992

[54] ALIGNMENT FILM FOR LIQUID CRYSTAL AND METHOD FOR PRODUCTION THEREOF, AS WELL AS LIQUID CRYSTAL DISPLAY DEVICE UTILIZING SAID ALIGNMENT FILM AND METHOD FOR PRODUCTION THEREOF

[75] Inventors: Kazufumi Ogawa, Hirakata; Norihisa Mino, Settsu; Hideharu Tamura, Tokyo, all of Japan

[73] Assignee: Matsushita Electric Industrial Co., Ltd., Osaka, Japan

[21] Appl. No.: 489,248

[22] Filed: Mar. 5, 1990

[30] Foreign Application Priority Data

Mar. 9, 1989 [JP] Japan ................................. 1-57004

[51] Int. Cl.[5] ..................... C09K 19/56; C09K 19/52; G02F 1/13
[52] U.S. Cl. ............................. 252/299.4; 252/299.01; 359/76
[58] Field of Search ....................... 252/299.01, 299.4; 350/340

[56] References Cited

U.S. PATENT DOCUMENTS

| 3,728,008 | 4/1973 | Allan et al. | 350/340 |
| 3,854,793 | 12/1974 | Kahn | 359/75 X |
| 4,151,326 | 4/1979 | Funada et al. | 428/447 |
| 4,490,015 | 12/1984 | Kawarada et al. | 350/340 |
| 4,674,842 | 6/1987 | Van de Venne | 350/340 |
| 4,678,283 | 7/1987 | Kreuzer et al. | 350/340 |
| 4,730,904 | 3/1988 | Pauluth et al. | 350/340 |

FOREIGN PATENT DOCUMENTS

| 0168242 | 7/1985 | European Pat. Off. |
| 0251548 | 6/1987 | European Pat. Off. |
| 0284313 | 9/1988 | European Pat. Off. | 252/299.01 |
| 57-16419 | 1/1982 | Japan | 350/340 |
| 0578522 | 1/1982 | Japan | 350/340 |

Primary Examiner—Robert L. Stoll
Assistant Examiner—C. Harris
Attorney, Agent, or Firm—Stevens, Davis, Miller & Mosher

[57] ABSTRACT

An alignment film for liquid crystal formed by monomolecular film comprising silane-type compounds with a linear hydrocarbon chain and method for production of said film, as well as liquid crystal display units utilizing said film and method for production of said display unit are disclosed.

15 Claims, 6 Drawing Sheets

FTIR SPECTRUM

ALIGNMENT FILM FOR LIQUID CRYSTAL AND METHOD FOR PRODUCTION THEREOF, AS WELL AS LIQUID CRYSTAL DISPLAY DEVICE UTILIZING SAID ALIGNMENT FILM AND METHOD FOR PRODUCTION THEREOF

BACKGROUND OF THE INVENTION

1. Field of the Invention

This invention relates to the alignment film for liquid crystals usable for planar display panels which display television picture images and computer picture images and method for production thereof, as well as liquid crystal display devices (sometimes referred to as units) utilizing said film and method for production thereof.

2. Related Art Statement

Liquid crystal display units such as color liquid crystal display panels have conventionally been produced by sealing liquid crystal between two substrates formed of a matrix of counter electrodes through an alignment film for liquid crystal formed by coating polyvinyl alcohol or polyimide using a spinner.

Figure 8:
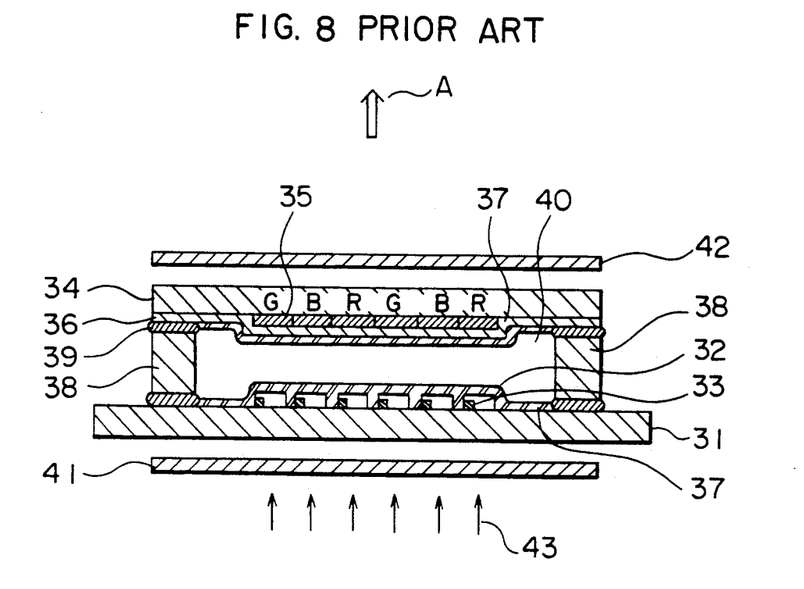
FIG. 8 shows a cross sectional view of a liquid crystal display unit using the conventional alignment film for liquid crystal.

These units, as shown in FIG. 8, are produced by precoating poly(vinyl alcohol) or polyimide using a spinner in an insulating manner onto the respective electrodes of the first glass substrate (31) with a thin-film transistor (hereinafter abbreviated as TFT) array (33) with a picture element electrode (32), and the second glass substrate (34) formed of multiple red, blue, and green color filters (35) and a common transparent electrode (36) on top of the aforementioned color filters, forming an alignment film for liquid crystal (37) by rubbing, then assembling them facing each other by electrode side on either side of the spacer (38) using the adhesive (39); the twist nematic (hereinafter abbreviated as TN) liquid crystal (40), etc., is then inserted, forming a panel structure; polarizing plates (41, 42) are then installed on the front and back sides of the panel, and the TFT is operated while irradiating with the back light (43) so that the color picture image is displayed in the arrow direction A.

However, the conventional production of an alignment films for liquid crystal involves dissolving polyvinyl alcohol or polyimide in an organic solvent, then forming a film using rotating coating methods, then finally rubbing it with a felt cloth; therefore, it was difficult to achieve uniform coating of the alignment film for liquid crystal panels with large surface areas, e.g., 14-inch display; further, rotating coating methods resulted in films up to several 5 $\mu$m thick, causing a large defect in performance of display panels such as ferroelectric liquid crystal requiring alignment films for liquid crystal with a thickness of approximately 1,000 Angstroms.

OBJECT AND SUMMARY OF THE INVENTION

The purpose of this invention is to provide a highly efficient, uniform, yet thin alignment film for liquid crystal and method for production thereof, as well as liquid crystal display devices utilizing said film and method for production thereof.

In conducting various tests to achieve the above-mentioned purpose, the inventors found that a film with superior uniformity in coating and a thickness of approximately 10–30 Angstroms could be achieved by mixing more than two types of silane-type compounds (also referred to as silane-type surfactants) in proportions of 10:1 to 1:10, and adsorbing the mixture onto the substrate to form a monomolecular film, and completed this invention.

Liquid crystal display units using alignment films for liquid crystal formed related with this invention have characteristics well suited to the production of large scale display panels.

1 . . . substrate; 2 . . . monomolecular film; 3, 3a . . . long hydrocarbon chain; 4, 4a . . . short hydrocarbon chain; 5 . . . liquid crystal; 6, 6a . . . nematic liquid crystal portion; 7 . . . nematic liquid crystal; 8, 8a . . . ferroelectric liquid crystal portion; 9 . . . ferroelectric liquid crystal; 11 . . . first electrode group; 13 . . . first substrate; 15 . . . second electrode group; 16 . . . second substrate; 17 . . . alignment film for liquid crystal; 20 . . . liquid crystal; 21 . . . polarizer; 22 . . . polarizer; 23 . . . back light; A . . . direction of picture image; 31 . . . first glass substrate; 32 . . . picture element electrode; 33 . . . TET array; 34 . . . second glass substrate; 35 . . . color filter; 36 . . . common transparent electrode; 37 . . . alignment liquid crystal film for liquid crystal; 38 . . . spacer; 39 . . . adhesive; 40 . . . twist nematic liquid crystal; 41 . . . polarizer; 42 . . . polarizer; 43 . . . back light; G . . . Green filter; B . . . Blue filter; R . . . Red filter.

DETAILED DESCRIPTION OF PREFERRED EMBODIMENTS

This invention solves the above-mentioned problem areas; one aspect of the invention is related with the alignment film for liquid crystal containing monomolecular film formed by adsorbing a mixture in 10:1 to 1:10 proportions of a silane-type compound with a long linear hydrocarbon chain and a silane-type compound with a hydrocarbon chain shorter than the aforementioned hydrocarbon chain onto the substrate. An even better alignment film for liquid crystal is produced by a monomolecular film formed by adsorbing a mixture in 10:1 to 1:10 proportions of a silane-type compound bonded to a liquid crystal molecule instead of a silane compound with a long linear hydrocarbon chain and a silane-type surfactant with a short hydrocarbon chain onto a substrate.

Moreover, the aforementioned method for production of alignment film for liquid crystal is derived from the process of directly forming a single layer of monomolecular film onto the substrate by submerging the substrate into a nonaqueous organic solution into which two or more types of silane-type compounds with varying lengths of linear hydrocarbon chain have been dissolved in proportions of 10:1 to 1:10, and causing the aforementioned silane-type compounds to be chemisorbed onto the substrate through chemical bonding between the silicone in the molecules of the aforementioned silane-type compound and the natural oxidization film on the surface of the aforementioned substrate.

Further, the liquid crystal display unit of this invention achieves better characteristics in case of placing two alignment films for liquid crystal facing each other consisting of monomolecular films formed by adsorbing a mixture in 10:1 to 1:10 proportions of a silane-type compound with a long linear hydrocarbon chain and a silane-type compound with a hydrocarbon chain shorter than the aforementioned hydrocarbon chain facing each other onto a substrate, and inserting the liquid crystal between them, or placing two alignment films for liquid crystal facing each other consisting of monomolecular films formed by adsorbing a mixture in 10:1 to 1:10 proportions of a silane-type compound bonded to a liquid crystal molecule instead of a silane compound with a long linear hydrocarbon chain and a silane-type surfactant with a short hydrocarbon chain onto a substrate and inserting the liquid crystal between them.

Moreover, the method for production of the liquid crystal display unit of this invention consists of a process chemisorbing silane-type compounds dissolved in 10:1 to 1:10 proportions in a nonaqueous organic solvent onto a first substrate on which a first electrode group have been installed and a second substrate with second electrode group facing each other by electrode side, then directly forming a single layer of monomolecular film as the alignment film for liquid crystal on each aforementioned substrate by chemically bonding the silicone in the aforementioned silane-type compound with the natural oxidization layer on the surface of the aforementioned substrate; a process affixing the aforementioned first substrate and second substrate facing each other with adhesive; and a process inserting the specified liquid crystal between the aforementioned first and second substrates.

Examples of silane-type compounds with long linear hydrocarbon chains are:

CH₃—(CH₂—)ₙ—SiCl₃

(n=an integer 10 to 25); and

CF₃—(CH₂—)ₙ—SiCl₃

(n=an integer 10 to 25):

Examples of silane-type compounds with short linear hydrocarbon chains are:

CH₃—(CH₂—)ₘ—SiCl₃

(m=an integer 1 to 5); and

CF₃—(CH₂—)ₘ—SiCl₃

(m=an integer 1 to 5).

Further, compounds represented by:

CF₃—(CF₂—)x—(CH₂—)y—SiCl₃

(x and y are both integers, and the sum of X and Y is 10 to 25) may also be used as silane-type compounds with long linear hydrocarbon chains.

Further, silane-type compounds bonded with ferroelectric liquid crystal such as azomethyne-type, azoxy-type, or ester-type liquid crystal, can be used instead of silane-type compounds with long linear hydrocarbon chains.

Further, it is possible to alter the orientation characteristics by adsorbing a mixture in specified proportions of a silane-type surfactant with an optional substituent ($R_1$) other than trichlorosilyl group in a section of the long linear hydrocarbon chain and a trichlorosilyl terminal group, and a silane-type surfactant with an optional substituent ($R_2$) other than trichlorosilyl group in a section of the short linear hydrocarbon chain and a trichlorosilyl terminal group.

Needless to say, any compound with a $$-\underset{|}{\overset{|}{Si}}-Cl$$

group can be used.

To be used, the above-mentioned compounds are mixed in proportions of 10:1 to 1:10, then dissolved in a nonaqueous organic solvent, e.g., n-paraffin types such as a n-hexadecane and n-cetane, CCl₄, chloroform, or a mixture of these.

Preferable substrates have a hydrophilic surface and forms a $$-\underset{\underset{O}{|}}{\overset{\overset{O}{|}}{Si}}-O-$$

bond when reacting with the Si in the above-mentioned compounds.

Because the structure of the alignment film for liquid crystal of this invention is that of direct monomolecular chemisorption of silane-type surfactants onto the surface of a substrate, it is uniform and thin.

Further, through adsorbing a silane-type surfactant consisting of a mixture of a compound with long linear hydrocarbon chains and one with shorter carbon chains than the aforementioned compound in proportions of 10:1 to 1:10, the liquid crystal molecules can insert themselves into the gaps in the aforementioned long hydrocarbon chains; thus, controllability of alignment of the liquid crystal molecules can be improved.

Moreover, by using silane-type surfactant whose molecules are bonded to the liquid crystal molecules, controllability of orientation is further improved.

EXAMPLES

Examples will be explained below using FIGS. 1 through 7.

Figure 1:
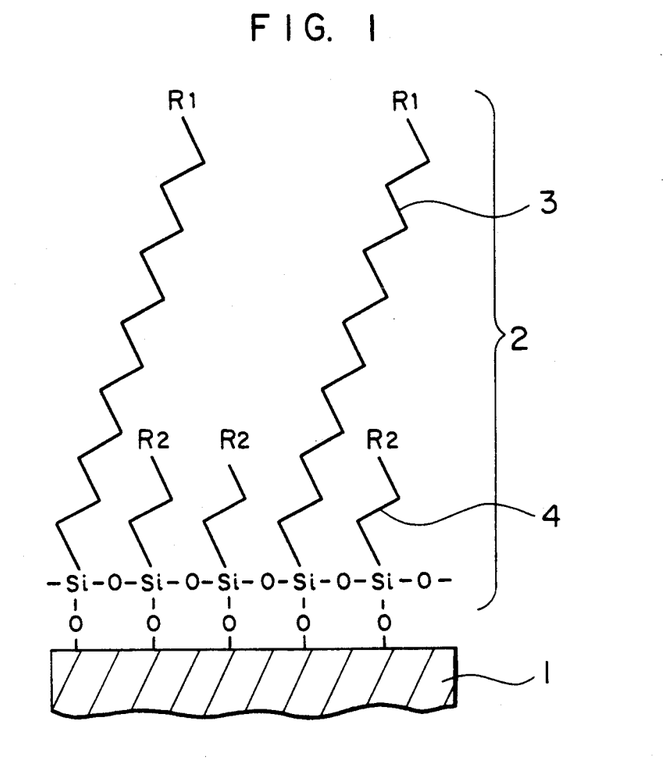
FIGS. 1, 3, and 5 show cross sectional views of the alignment film for liquid crystal of Examples of this invention magnified to the molecular level.

For example, as shown in FIG. 1, after drying a hydrophilic substrate 1 (e.g., glass or quartz), silane-type surfactant is adsorbed by chemisorption directly onto the entire surface, forming a monomolecular film (2) consisting of a silane-type surfactant ($R_1$ and $R_2$ in FIG.

1 indicate substituents, but may also be hydrogen). For example, the compound of the formula:

$CH_3—(CH_2—)_n—SiCl_3$ (n=an integer, optimally 10 to 25) is used as a silane-type compound with a long linear hydrocarbon chain (3), and mixed in a 1:2 proportion with the compound of the formula:

$CH_3—(CH_2—)_m—SiCl_3$ m=an integer 1 to 5) which has a shorter hydrocarbon chain (4) than aforementioned (3), then the resultant mixture is dissolved at an approximately $2 \times 10^{-3}$ to $5 \times 10^{-2}$ mol/L concentration in a mixed solution of n-hexadecune (80 v/v %), carbon tetrachloride (12 v/v %), and chloroform (8 v/v %); the aforementioned substrate (1) is immersed in this solution. At this time, the aforementioned substrate (1) has a hydrophilic surface, containing —OH groups in the surface.

Figure 2:
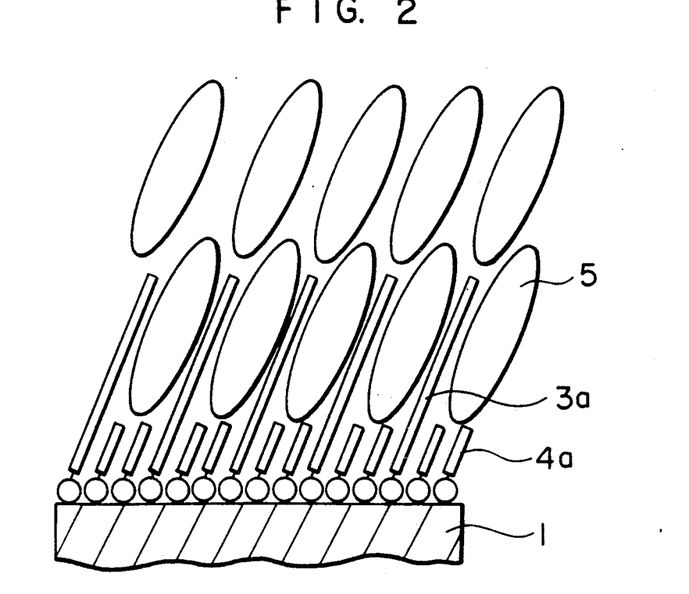
FIGS. 2, 4, and 6 show conceptional cross sectional views of the alignment film for liquid crystal of Examples of this invention to which liquid crystal has been inserted.

Thus, the —SiCl$_3$ group in the silane-type surfactant and the —OH group in the surface of the substrate (1) react, generating a bond of forming a single layer (10 to 30 Angstroms) of monomolecular film (2) comprising silane-type surfactants on the surface of the substrate (1). That is, conventional films are several hundred microns thick and require rubbing; by using the process of this invention, a hydrohobic monomolecular film (2) of 10 to 30 Angstroms, consisting of long linear hydrocarbon chains (3) and short hydrocarbon chains (4) in specific proportions in side-by-side can be formed on the substrate (1). Thus, as shown in FIG. 2, when liquid crystal comes in contact with a substrate on which this type of monomolecular film has been formed, the molecules of the liquid crystal (5) insert themselves into the gaps in the monomolecular film of long hydrocarbon chains (3a), controlling the overall alignment of liquid crystals, forming an alignment film for liquid crystal. Further, (3a) and (4a) in FIG. 2 are conceptional indications of the long hydrocarbon chain (3) and the short hydrocarbon chain (4) in FIG. 1.

Further, any compound may be used instead of the above-mentioned compounds, as far as such a compound has in its molecule groups capable of bonding with —OH groups.

Figure 3:
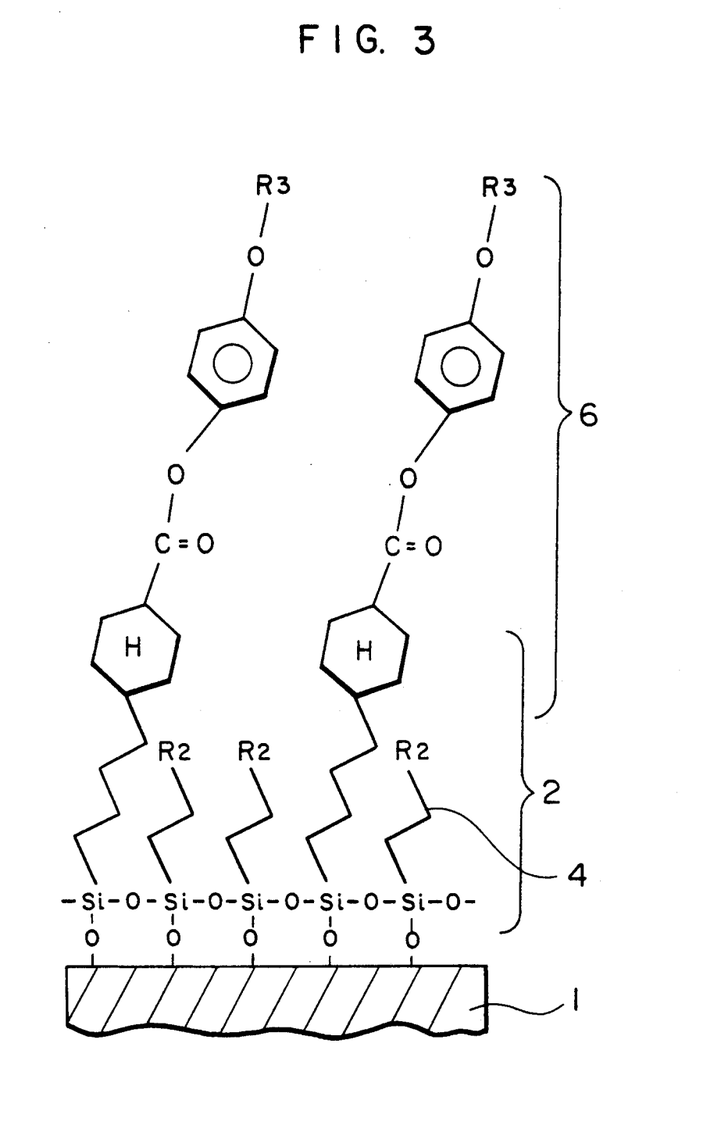

Moreover, as shown in FIG. 3, by mixing a silane-type surfactant bonded with the same liquid crystal molecules as those of the sealed liquid crystal (e.g., nematic liquid crystal portion (6)) and a silane-type surfactant with a short hydrocarbon chain (4) in specified proportions, forming an alignment film for liquid crystal through adsorption, an alignment film for liquid crystal with especially superior characteristics of orientation to the sealed specific liquid crystal can be produced (R$_3$ in FIG. 3 normally indicates substituents of hydrocarbon chains, but may be hydrogen atom).

Figure 4:
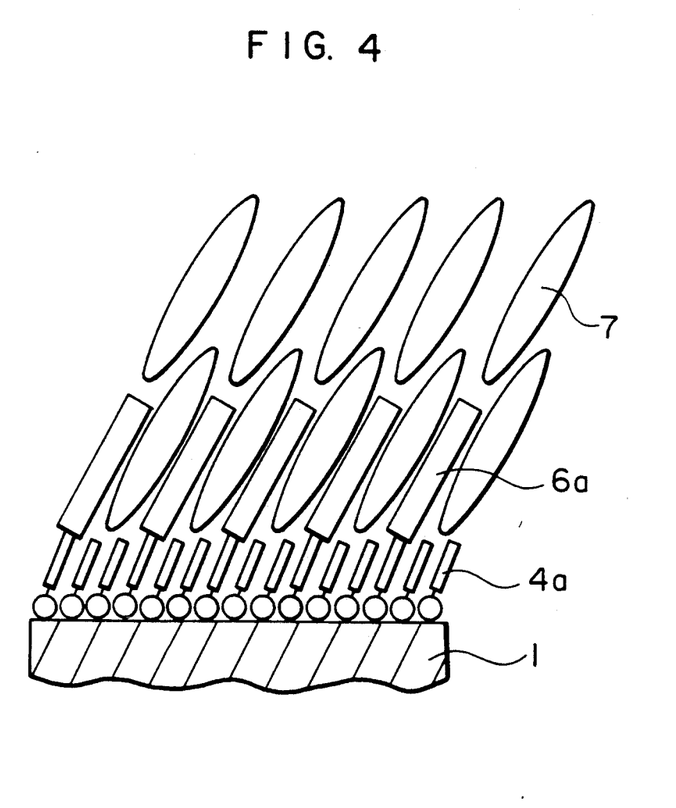

Thus, as shown in FIG. 4, when the nematic liquid crystal (7) comes in contact with this type of substrate formed of a monomolecular film with a nematic crystal portion (6a), the molecules of the nematic liquid crystal (7) insert themselves into the space in the nematic crystal portion (6a), resulting in an excellent control of the overall liquid crystal orientation. Further, (4a) and (6a) shown in FIG. 4 are conceptional indications of the short carbon chain (4) and the nematic liquid crystal portion (6) shown in FIG. 3.

Figure 5:
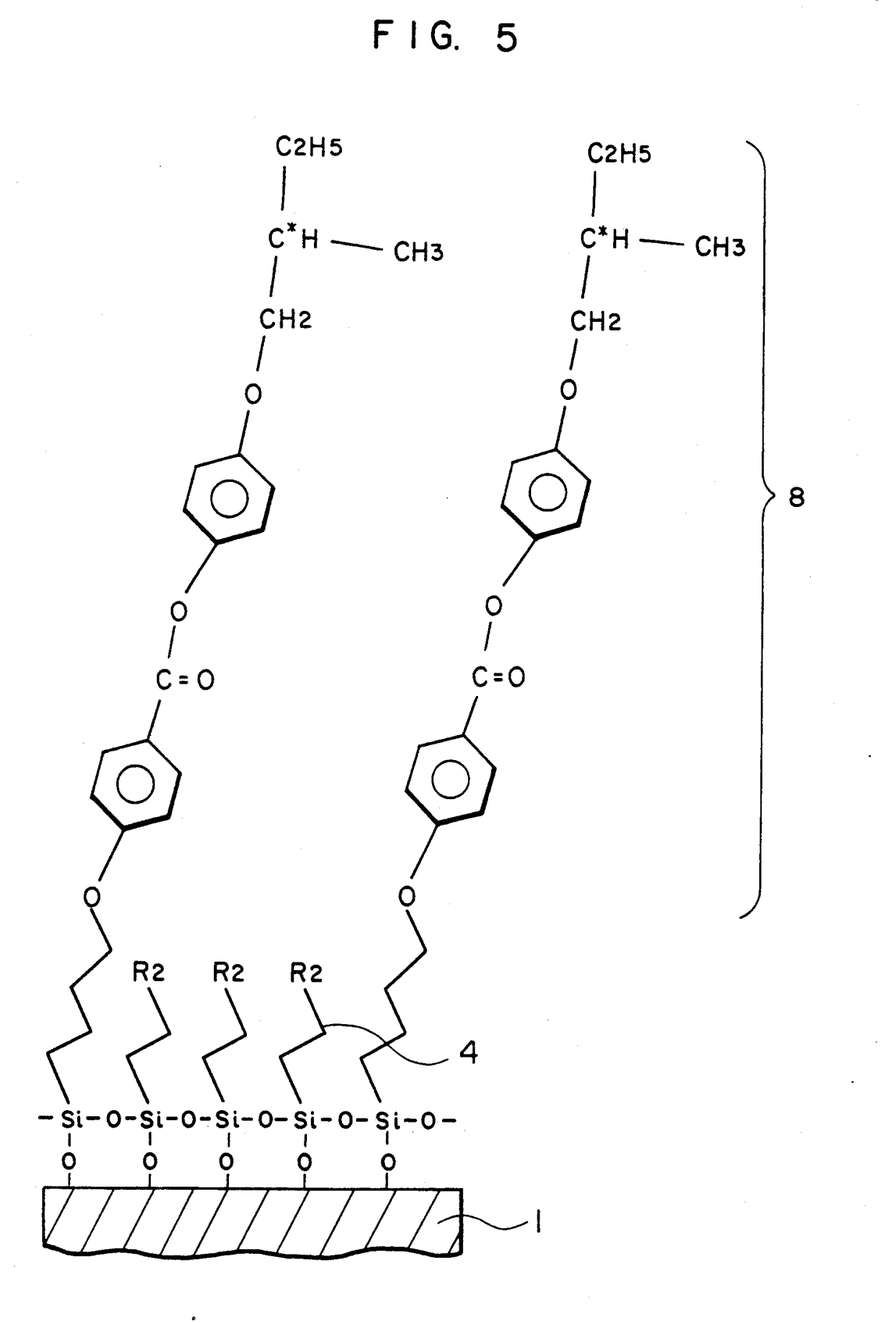
Figure 6:
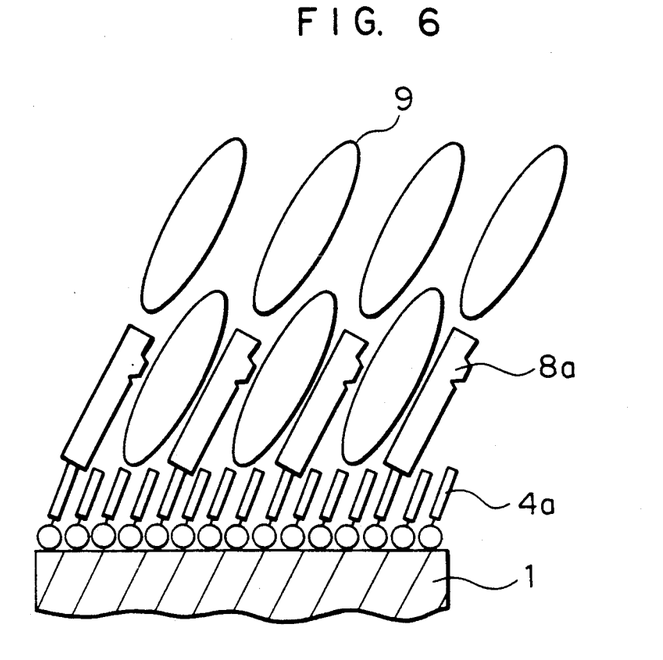

Moreover, as shown in FIG. 5, when the liquid crystal molecules to be sealed are ferroelectric liquid crystal, if the silane-type surfactant bonded to the ferroelectric liquid crystal portion (8) and the silane-type surfactant with a short hydrocarbon chain (4) are adsorbed in specified proportions, an alignment film for liquid crystal consisting of monomolecular film can be produced. Also, as shown in FIG. 6, when the ferroelectric liquid crystal (9) comes in contact with a substrate with a monomolecular film containing this type of ferroelectric liquid crystal portion (8a), the ferroelectric liquid crystal molecules (9) insert themselves into the gaps in the ferroelectric liquid crystal portion (8a) of the monomolecular film, resulting in excellent control of the overall liquid crystal orientation. Further, (4a) and (8a) shown in FIG. 6 are conceptional indications of the short carbon chain (4) and the nematic liquid crystal portion (8) shown in FIG. 5.

The examples described above are the most representative cases of alignment film for liquid crystal in which multiple silane-type surfactants mixed in specified proportions are concurrently chemisorbed, and of an alignment film for liquid crystal consisting of monomolecular film formed of a silane-type surfactant bonded to liquid crystal molecules and a silane-type surfactant with a short hydrocarbon chain which are adsorbed in specified proportions; however, in cases where an alignment film for liquid crystal is formed, through adsorption of only a silane-type surfactant with long linear hydrocarbon chains, an alignment film for liquid crystal able to orient the aforementioned liquid crystal almost perpendicularly is produced.

Figure 9:
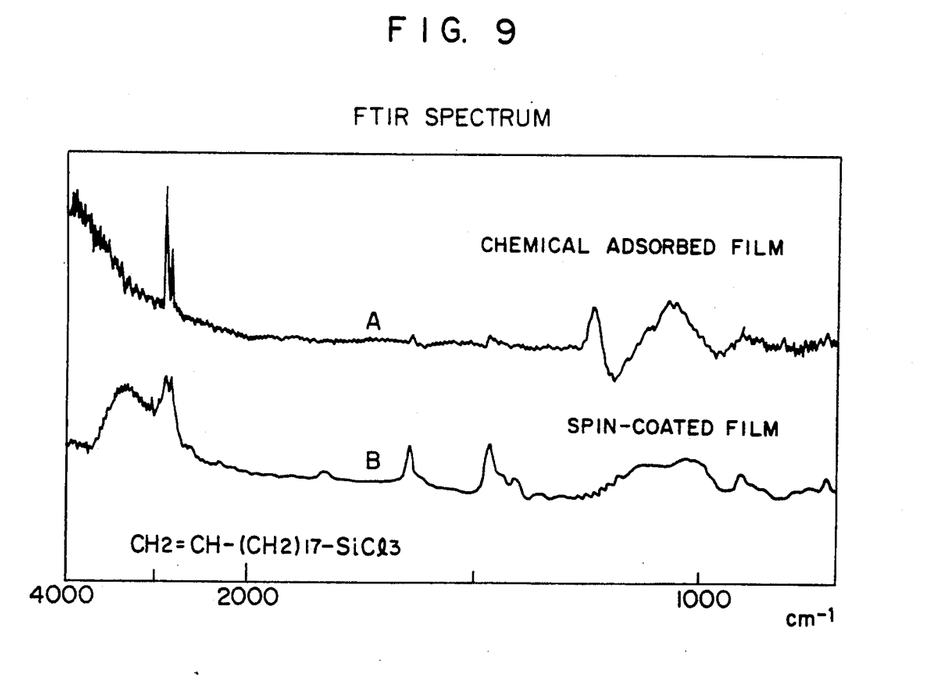
FIG. 9 shows the FTIR spectrum of an alignment film formed by adsorption method and an alignment film formed by conventional spin-coat method. The numbers and codes used in the figures are described below.

As an example, FIG. 9 shows the spectrum data measured by FTIR spectroscopy of an alignment film produced through adsorption compared to that of an alignment film produced by the conventional spin-coating method.

The test compound used here was $CH_2=CH—(CH_2—)_{17}—SiCl_3$; in the alignment film produced by adsorption (A), the adsorptions of 2930 cm$^{-1}$ and 2860 cm$^{-1}$ were clearly split, but in the spin-coated oriented film (B), two adsorption peaks overlapped; thus it was determined that the hydrocarbon chain is oriented almost perpendicularly to the substrate in the adsorbed monomolecular film, but the orientation in the spin-coated film was irregular at the molecular level.

Figure 7:
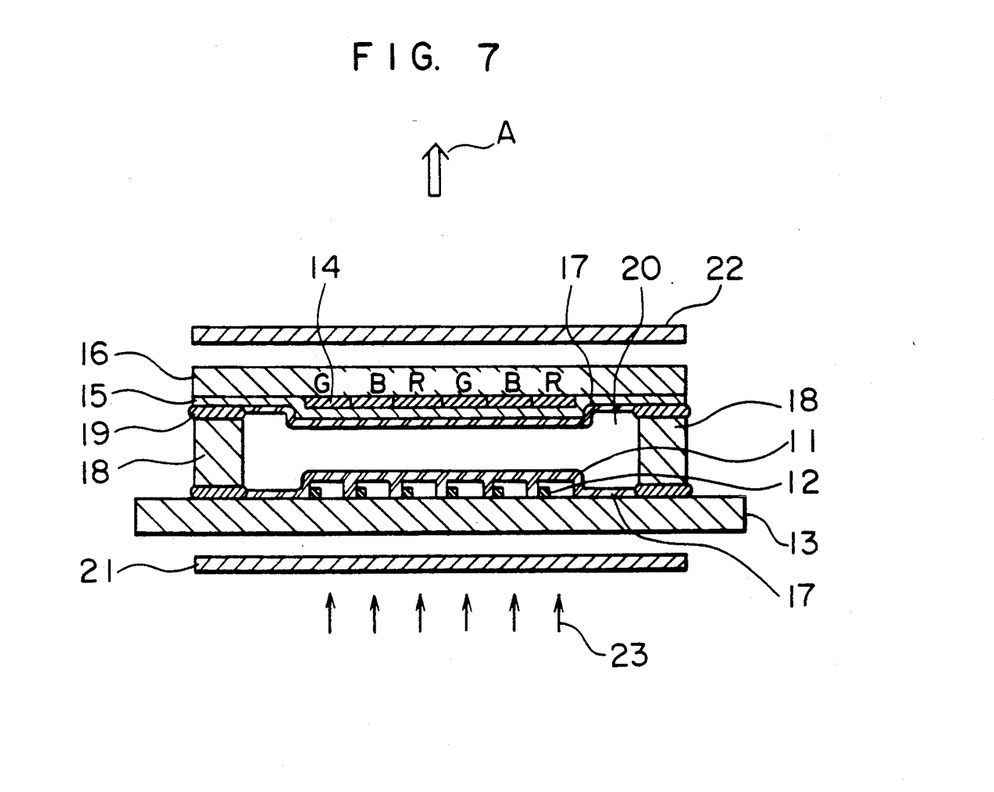
FIG. 7 shows a cross sectional view of a liquid crystal display unit using the alignment film for liquid crystal of this invention.

As shown in FIG. 7, when producing a liquid crystal display unit using an alignment film for liquid crystal comprising monomolecular film of two types of silane-type compounds with different linear hydrocarbon chain lengths, silane-type surfactants which can efficiently control the orientation of long molecules dissolved in n-cetane are chemisorbed onto the second substrate (16), on which a matrix has been formed in advance; thereby single layers of monomolecular film for alignment film for liquid crystal (17) is formed onto the surface of the aforementioned substrate through the chemical bonding between the silicone in the aforementioned silane-type surfactants and the —OH group in the natural oxidization film on the surface of the aforementioned substrate. Next, the aforementioned first substrate (13) is installed facing the second substrate (16) across the spacer (18), and then fixed using adhesive (19). Next, the specified liquid crystal (20) is inserted between the aforementioned first substrate (13) and the second substrate (16). It is then completed by assembling the polarizers (21) and (22). With this type of liquid crystal display unit, a picture image can be displayed in the direction of the arrow (A) by driving various transistors using video signals while irradiating the entire surface with the back light (23).

As described above, because the alignment film for liquid crystal of this invention is structured by the direct monomolecular chemisorption of silane-type surfactants onto the surface of the substrate, it is efficient, uniform, and thin; further, it has the ability to improve the controlling characteristics of the liquid crystal molecule orientation.

Moreover, by using silane-type surfactants with molecules bonded to the liquid crystal molecules, the controlling characteristics of the orientation is further improved.

Also, in liquid crystal display units using the oriented film for liquid crystal of this invention, the insulating film between the liquid crystal and the electrode is extremely, thin; therefore, the energy requirements to drive the liquid crystal display unit can be reduced.

Further, because the alignment film produced by the process of this invention, as well as liquid crystal cells using this alignment film, have the ability to line up the molecules with large intramolecular dipoles in a specific direction, extremely large secondary nonlinear optical effects can be generated.

What is claimed is:

1. An alignment film for liquid crystal which comprises a monomolecular film of a silane-type surfactant with a linear carbon chain which is formed by chemisorption of a mixture of a silane-type surfactant having a long linear hydrocarbon chain of 10 to 25 carbon atoms and a total carbon number of 11 to 26 and a silane-type surfactant having a short linear hydrocarbon chain which is shorter than said long linear hydrocarbon chain as the silane-type surfactant with a linear carbon chain, onto the electrode directly or through a thin film,
wherein the proportion in the mixture of the surfactant having the long hydrocarbon chain to the surfactant having the short hydrocarbon chain is 10:1 to 1:10.

2. An alignment film for liquid crystal according to claim 1 wherein the number of carbon atoms in said short hydrocarbon chain is 1 to 5.

3. An alignment film for liquid crystal according to claim 1 wherein said long linear hydrocarbon chain has one terminal which has a substituent other than trichlorosilyl group and another terminal which is a trichlorosilyl group, and said short hydrocarbon chain being one in which one terminal has a substituent other than trichlorosilyl group and another terminal is a trichlorosilyl group.

4. An alignment film for liquid crystal which comprises a monomolecular film of a silane-type surfactant having gaps therein filled with liquid crystal molecules formed by mixed adsorption of a silane-type surfactant having a long linear hydrocarbon chain of 10 to 25 carbon atoms and a total carbon number of 11 to 26, a silane-type surfactant having a short linear hydrocarbon chain which is shorter than said long linear hydrocarbon chain and liquid crystal molecules onto an electrode either directly or through an optional thin film,
wherein the proportion of the surfactant having the long hydrocarbon chain to the surfactant having the short hydrocarbon chain is 10:1 to 1:10.

5. An alignment film for liquid crystal according to claim 4, wherein nematic liquid crystal is utilized as the liquid crystal molecules.

6. An alignment film for liquid crystal according to claim 4 wherein said gaps in said silane-type surfactant are filled with ferroelectric liquid crystal as the liquid crystal molecules.

7. A method for production of an alignment film for liquid crystal which comprises depositing onto the surface of a substrate on which electrodes are formed, a single layer of a monomolecular film formed by chemisorption of a mixture of more than two types of silane-type surfactants in a nonaqueous organic solvent,
wherein at least one surfactant has a long linear hydrocarbon chain of 10 to 25 carbon atoms and a total carbon number of 11 to 26 and at least one surfactant has a short linear hydrocarbon chain which is shorter than said long linear hydrocarbon chain, the proportion in the mixture of the surfactant having the long hydrocarbon chain to the surfactant having the short hydrocarbon chain being 10:1 to 1:10,
whereby chemical bonding of —Si—O— between the Si—Cl groups in the aforementioned mixture and the —OH groups contained in the natural oxidation film on the surface of the aforementioned substrate occurs.

8. The method of claim 7 wherein the substrate is first coated with a thin film of a silane-type surfactant prior to deposition of said monomolecular film.

9. The method of claim 7 wherein the chemical bonding is directly to the substrate.

10. A method for production of an alignment film for liquid crystal which comprises depositing onto the surface of a substrate on which transparent electrodes are formed, a single layer of a molecular film formed by chemisorption of a mixture of two or more types of silane-type surfactants with different lengths of linear hydrocarbon chains in a nonaqueous solvent, forming the chemical bonding of —Si—O— between the Si—Cl group in the aforementioned mixture and the —OH groups contained in the natural oxidation film on the surface of the aforementioned substrate,
wherein at least one surfactant has a long linear hydrocarbon chain of 10 to 25 carbon atoms and a total carbon number of 11 to 26 and at least one surfactant has a short linear hydrocarbon chain which is shorter than said long hydrocarbon chain, the proportion in the mixture of the surfactant having the long hydrocarbon chain to the surfactant having the short hydrocarbon chain being 10:1 to 1:10.

11. A method for production of an alignment film for liquid crystal according to claim 10 wherein a silane-type surfactant with a long linear hydrocarbon chain in which one terminal is substituent other than trichlorosilyl group and another terminal is a trichlorosilyl group, and a silane-type surfactant with a short hydrocarbon chain in which one terminal is a substituent other than trichlorosilyl group and another end is a trichlorosilyl group are utilized.

12. A method for production of an alignment film for liquid crystal according to claim 10 wherein a chemical substance in which one terminal is a group or a chemical substance represented by $CH_3-(CH_2-)_n-SiCl_3$ (n: integer from 10 to 25) is utilized as a silane-type surfactant with a long linear carbon chain.

13. A method for production of an alignment film for liquid crystal according to claim 10 wherein a silane-type surfactant in which one terminal is bonded with a trichlorosilyl group, and a silane-type surfactant in which one terminal of the short hydrocarbon chain is substituent other than trichlorosilyl group and another terminal is a trichlorosilyl group, are utilized.

14. A method for production of an alignment film for liquid crystal according to claim 10 wherein nematic liquid crystal is utilized as the liquid crystal molecules.

15. A method for production of an alignment film for liquid crystal according to claim 10 which comprises the formation of a monomolecular film through the adsorption of a silane-type surfactant bonded with ferroelectric liquid crystal as a liquid crystal molecule and a silane-type surfactant with a short hydrocarbon chain in specified proportions.

* * * * *